United States Patent
van den Oord et al.

(10) Patent No.: US 12,518,143 B2
(45) Date of Patent: *Jan. 6, 2026

(54) FEEDFORWARD GENERATIVE NEURAL NETWORKS

(71) Applicant: GDM Holding LLC, Mountain View, CA (US)

(72) Inventors: Aaron Gerard Antonius van den Oord, London (GB); Karen Simonyan, London (GB); Oriol Vinyals, London (GB)

(73) Assignee: GDM Holding LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/607,777

(22) Filed: Mar. 18, 2024

(65) Prior Publication Data
US 2024/0346285 A1     Oct. 17, 2024

Related U.S. Application Data

(63) Continuation of application No. 15/985,463, filed on May 21, 2018, now Pat. No. 11,934,935.

(Continued)

(51) Int. Cl.
*G06N 3/04*     (2023.01)
*G06N 3/045*    (2023.01)
(Continued)

(52) U.S. Cl.
CPC .............. *G06N 3/04* (2013.01); *G06N 3/045* (2023.01); *G06N 3/08* (2013.01); *G06N 3/088* (2013.01); *G10L 13/00* (2013.01)

(58) Field of Classification Search
CPC ............ G06N 3/04; G06N 3/045; G06N 3/08; G06N 3/088; G06N 3/0475; G06N 3/09; G06N 3/096; G06N 3/0464; G10L 13/00
See application file for complete search history.

(56) References Cited

U.S. PATENT DOCUMENTS

| 10,186,252 B1 | 1/2019 | Mohannnnad |
| 10,867,597 B2 | 12/2020 | Deoras et al. |

(Continued)

FOREIGN PATENT DOCUMENTS

| CN | 106462802 | 2/2017 |
| CN | 106683663 | 5/2017 |

OTHER PUBLICATIONS

Mehri, Soroush, et al. "SampleRNN: An unconditional end-to-end neural audio generation model." arXiv preprint arXiv:1612.07837 (2016). (Year: 2016).*

(Continued)

*Primary Examiner* — Miranda M Huang
*Assistant Examiner* — Sidney Vincent Bostwick
(74) *Attorney, Agent, or Firm* — Fish & Richardson P.C.

(57) ABSTRACT

A feedforward generative neural network that generates an output example that includes multiple output samples of a particular type in a single neural network inference. Optionally, the generation may be conditioned on a context input. For example, the feedforward generative neural network may generate a speech waveform that is a verbalization of an input text segment conditioned on linguistic features of the text segment.

19 Claims, 5 Drawing Sheets

Related U.S. Application Data

(60) Provisional application No. 62/509,053, filed on May 20, 2017.

(51) Int. Cl.
  *G06N 3/08* (2023.01)
  *G06N 3/088* (2023.01)
  *G10L 13/00* (2006.01)

(56) References Cited

U.S. PATENT DOCUMENTS

| | | |
|---|---|---|
| 2015/0161522 A1 | 6/2015 | Saon |
| 2017/0278513 A1 | 9/2017 | Li et al. |
| 2018/0190249 A1* | 7/2018 | Roblek ............... G10H 1/0025 |
| 2018/0365554 A1 | 12/2018 | Gerard |
| 2019/0050710 A1 | 2/2019 | Wang et al. |

OTHER PUBLICATIONS

Wang, Xin, Shinji Takaki, and Junichi Yamagishi. "Investigation of using continuous representation of various linguistic units in neural network based text-to-speech synthesis." IEICE Transactions on Information and Systems 99.10 (2016):2471-2480. (Year: 2016).*

Paine, Tom Le, et al. "Fast wavenet generation algorithm." arXiv preprint arXiv:1611.09482 (2016). (Year: 2016).*

Li, Jinyu, et al. "Learning small-size DNN with output-distribution-based criteria." interspeech. 2014. (Year: 2014).*

Abadi et al. "Tensorflow: Large-scale machine learning on heterogeneous distributed systems," arXiv 1603.04467v2, Mar. 16, 2016, 19 pages.

Arik et al., "Deep Voice: Real-time Neural Text-to-Speech," CoRR, 2017, https://arxiv.org/abs/1702.07825v2, 17 pages.

Chen et al. "Variational Lossy Autoencoder," arXiv1611.02731v2, Mar. 4, 2017.

Chouireb, Fatima, and Mhania Guerti, "Towards a high quality Arabic speech synthesis system based on neural networks and residual excited vocal tract model." Signal, Image and Video Processing 2.1 (2008): 73-87. (Year: 2008).

Diederik et al. "Adam: A method for stochastic optimization," arXiv 1412.6980v9, Jan. 30, 2017, 15 pages.

Dinh et al. "Density estimation using real nvp," arXiv 1605.08803v3, Feb. 27, 2017, 32 pages.

Dinh et al. "Nice: Non-linear independent components estimation," arXiv 1410.8516v6, Apr. 10, 2015, 13 pages.

EP Office Action in European Appln. No. 18726146.6, dated Jul. 20, 2020, 10 pages.

Extended Search Report in European Appln. No. 21207203.7, dated Jan. 18, 2022, 11 pages.

Faria, Arlo. "Discriminative Acoustic Features for Deployable Speech Recognition." Electrical Engineering and Computer Sciences, University of California at Berkeley, Technical Report No. UCB/EECS-2016-199 (2016). (Year: 2016).

Gatys et al. "A neural algorithm of artistic style," arXiv 1508.06576v2, Sep. 2, 2015, 16 pages.

Germain et al. "Made: Masked autoencoder for distribution estimation," Proceedings of the 32$^{nd}$ International Conference on Machine Learning, Jun. 2015, 9 pages.

Goodfellow et al. "Generative adversarial nets," Advances in Neural Information Processing Systems, Dec. 2014, 9 pages.

Goodfellow. "NIPS 2016 Tutorial: Generative Adversarial Networks," arXiv 1701.00160, Apr. 3, 2017, 57 pages.

Graves. "Generating sequences with recurrent neural networks," arXiv 1308.0850v5 Jun. 5, 2014, 43 pages.

Gu et al. "Non-autoregressive neural machine translation," arXiv 1711.02281v2 Mar. 9, 2018, 13 pages.

Hinton et al. "Deep neural networks for acoustic modeling in speech recognition: The shared views of four research groups" IEEE Signal Processing Magazine, 29(6), Nov. 2012, 16 pages.

Hinton et al. "Distilling the knowledge in a neural network," arXiv 1503.02531, Mar. 9, 2015, 9 pages.

Johnson et al. "Perceptual losses for real-time style transfer and super-resolution," European Conference on Computer Vision, Springer, Oct. 2016, arXiv1603.08155, 18 pages.

Kalchbrenner et al. "Video pixel networks," arXiv 1610.00527, Oct. 3, 2016, 16 pages.

Kingma et al. "Improving variational inference with inverse autoregressive flow," arXiv 1606.04934v2, Jan. 30, 2017, 16 pages.

Krizhevsky et al. "Imagenet classification with deep convolutional neural networks," Advances in neural information processing systems, Dec. 2012.

Larochelle et al. "The neural autoregressive distribution estimator," Proceedings of the Fourteenth International Conference on Artificial Intelligence and Statistics, Jun. 2011, 9 pages.

Le Paine et al. Fast wavenet generation algorithm, 1611.09482, Nov. 29, 2016, 6 pages.

Li et al. "Learning Small-Size DNN with Output-Distribution-Based Criteria," Interspeech Sep. 1, 2014, 5 pages.

Li, Kan, and José C. Principe. The kernel adaptive autoregressive-moving-average algorithm. IEEE transactions on neural networks and learning systems 27.2 (2015): 334-346. (Year: 2015).

Mikolov et al. "Recurrent neural network based language model," Eleventh Annual Conference of the International Speech Communication Association, presentation, Sep. 2010, 24 pages.

PCT International Preliminary Report on Patentability in International Appln. No. PCT/EP2018/063290, dated Nov. 26, 2019, 14 pages.

PCT International Search Report and Written Opinion issued in International Application No. PCT/EP2018063290, mailed on Aug. 24, 2018, 20 pages.

Polyak et al. "Acceleration of stochastic approximation by averaging," SIAM Journal on Control and Optimization, 30(4), Jul. 1992, 18 pages.

Rezende et al. "Variational inference with normalizing flows," arXiv 1505.05770v6, Jun. 14, 2016, 10 pages.

Romero et al. "FitNets: hints for thin deep nets," arXiv 1412.6550v4, Mar. 27, 2015, 13 pages.

Salimans et al. "Pixelcnn++: Improving the pixelcnn with discretized logistic mixture likelihood and other modifications," arXiv 1701.05517, Jan. 19, 2017, 10 pages.

Sonderby et al. "Amortised map inference for image super-resolution," ar Xiv 1610.04490v3, Feb. 21, 2017, 17 pages.

Szegedy et al. "Going deeper with convolutions," Proceedings of the IEEE conference on Computer Vision and Pattern Recognition, Jun. 2015, 9 pages.

Theis et al. "Generative image modeling using spatial lstms," Advances in Neural Information Processing Systems, Dec. 2015, 9 pages.

TW Office Action in Taiwan Appln. No. 107117284, dated Sep. 21, 2020, 6 pages (with English translation).

TW Office Action in Taiwanese Appln. 107117284, dated May 3, 2019, 13 pages (with English translation).

TW Office Action in Taiwanese Appln. No. 107117284, dated Feb. 6, 2020, 9 pages (with English translation).

Van den Oord et al. "Conditional image generation with pixelcnn decoders," Advances in Neural Information Processing Systems, Dec. 2016, 9 pages.

Van den Oord et al. "Pixel recurrent neural networks," arXiv 1601.06759v3, Aug. 19, 2016, 11 pages.

Van den Oord et al. "Wavenet: A Generative Model for Raw Audio," SSW, Sep. 2016, 15 pages.

Wu et al. "Google's neural machine translation system: Bridging the gap between human and machine translation," arXiv1609.08144v2, Oct. 8, 2016, 23 pages.

Decision to Grant Patent in Chinese Appln. No. 201880027095.2, dated Aug. 31, 2023, 8 pages (with English translation).

Li et al., "Speech Coding System Based on Nonlinear Prediction of Dynamic Wavelet Neural Network," Journal of Circuits and Systems, Oct. 30, 2005, 10(5):10 pages.

* cited by examiner

FEEDFORWARD GENERATIVE NEURAL NETWORKS

CROSS-REFERENCE TO RELATED APPLICATION

This patent application is a continuation (and claims the benefit of priority under 35 USC 120) of U.S. patent application Ser. No. 15/985,463, filed May 21, 2018, which claims priority to U.S. Provisional Application No. 62/509,053, filed on May 20, 2017. The disclosure of the prior applications is considered part of and is incorporated by reference in the disclosure of this application.

BACKGROUND

This specification relates to generative neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes a feedforward generative neural network. A feedforward generative neural network is a neural network that generates an output example that includes multiple output samples of a particular type in a single neural network inference. Optionally, the generation may be conditioned on a context input. For example, the feedforward generative neural network may generate a speech waveform that is a verbalization of an input text segment conditioned on linguistic features of the text segment.

Thus in one implementation this specification describes a method of training a feedforward generative neural network having a plurality of feedforward parameters and configured to generate output examples of a first type conditioned on context inputs of a second type. Each output example includes a respective output sample at each of a plurality of generation time steps. The feedforward generative neural network is configured to receive a feedforward input comprising a context input and to process the feedforward input to generate a feedforward output that defines, for each of the generation time steps, a respective likelihood distribution over possible values for the output sample at the generation time step. The training comprises obtaining a training context input; processing a training feedforward input comprising the training context input using the feedforward generative neural network in accordance with current values of the feedforward parameters to generate a training feedforward output; and processing the training context input using a trained autoregressive generative neural network. The trained autoregressive generative neural network has been trained to autoregressively generate, for each of the plurality of generation time steps, an autoregressive output that defines a likelihood distribution over possible values for the output sample at the generation time step conditioned on output samples at preceding generation time steps. The method further comprises determining a first gradient with respect to the feedforward parameters to minimize a divergence loss. The divergence loss depends on, for each of the generation time steps, a first divergence from (between) the likelihood distribution defined by the autoregressive output for the generation time step and (of) the likelihood distribution for the generation time step defined by the training feedforward output. The method further comprises determining an update to the current values of the feedforward parameters based at least in part on the first gradient.

Advantages of such methods are described later. Generally, but not necessarily, the feedforward input further comprises a respective noise input at each of the generation time steps. In some implementations this facilitates generating output distributions for a set of samples in parallel, which is therefore much quicker than an autoregressive approach.

The first divergence may be, for example, a KL divergence or a Jensen-Shannon Divergence. The divergence loss may depend, at least in part, on a sum of the first divergences at each of the time steps.

The training may further comprise obtaining a ground-truth output example for the training context input and generating, from the training feedforward output, a predicted output example by sampling from the probability distributions. The predicted output example may be used to determine another gradient for the training.

Thus the ground-truth output example and the predicted output example may define waveforms such as speech waveforms. The training may then further comprise generating a first magnitude spectrogram of the ground-truth output example; generating a second magnitude spectrogram of the predicted output example; and determining a second gradient with respect to the feedforward parameters to minimize a magnitude loss that depends on the difference between the first and second magnitude spectrograms. Determining the update to the current values of the feedforward parameters may comprise determining the update based at least in part on the second gradient. A magnitude spectrogram may comprise, for example, data defining an amplitude, energy or similar magnitude spectrum of a waveform, for example representing the power in different frequency bands.

Additionally or alternatively the training may comprise processing the ground-truth output example using a trained feature generation neural network to obtain features of the ground-truth output example. The trained feature generation neural network may be a pre-trained neural network that takes a waveform as input. The training may further comprise processing the predicted output example using the trained feature generation neural network to obtain features of the predicted output example. The training may then comprise determining a third gradient with respect to the feedforward parameters to minimize a perceptual loss. The perceptual loss may be defined as a loss that depends on a measure of difference between the features of the ground-truth output example and the features of the predicted output example. Determining the update to the current values of the feedforward parameters may comprise determining the update based at least in part on the third gradient.

The feature generation neural network may comprise a speech recognition neural network, in particular when the output examples comprise speech waveforms. More generally the feature generation neural network may comprise a trained autoregressive generative neural network. In these and other implementations the features may be outputs of an intermediate layer in the feature generation network.

The training may additionally or alternatively comprise obtaining a different context input; processing the different context input using the trained autoregressive generative neural network to obtain, for each of the plurality of generation time steps, a respective different autoregressive output; and determining a fourth gradient with respect to the feedforward parameters to maximize a contrastive loss. In broad terms, here the contrastive loss defines a similarity measure between two distributions. Thus the contrastive loss may be defined as a loss that depends at least in part on, for each of the generation time steps, a second divergence from the likelihood distribution defined by the different autoregressive output for the generation time step and the likelihood distribution for the generation time step defined by the training feedforward output. Determining the update to the current values of the feedforward parameters may then comprise determining the update based at least in part on the fourth gradient.

There is also described a method of generating an output example. The method may comprise receiving a context input and generating an output example by processing a feedforward network input comprising the context input using a feedforward generative neural network that has been trained using a method as described above. The feedforward network input may include a noise input.

There is further described a method comprising receiving a request to generate a waveform comprising a plurality of samples conditioned on a conditioning tensor that represents features of text input; obtaining a random noise vector that includes a noise value for each of the plurality of samples; and processing the random noise vector using a feedforward generative neural network to generate the waveform. The feedforward generative neural network may comprise a sequence of groups of convolutional neural network layers. Each group may be conditioned on the conditioning tensor. Each group may be configured to receive an input waveform and transform the waveform conditioned on the conditioning tensor into an output waveform.

The input waveform to the first group of convolutional neural network layers may be the random noise vector. The input waveform for each group of convolutional neural network layers other than the first group may be an output waveform of the group immediately before the group. The generated waveform may be the output of the last group of convolutional neural network layers.

In some implementations a group of convolutional neural network layers may comprise one or more layers having a activation function gated by the conditioning tensor. For example the activation function may be a function of a convolution of the conditioning tensor with one or more learnable weights. Each group of convolutional layers may include one or more residual blocks that each include one or more dilated convolutional layers, facilitating modelling long-term causal dependencies. For example, in some implementations each group of convolutional layers may have a structure similar to WaveNet (referenced later), but employing a random noise vector as input. The sequence of groups of convolutional neural network (CNN) layers may comprise a chain of groups of CNN layers between the input and the output.

The feedforward generative neural network may generate an output that defines a respective probability distribution over possible values for each of the plurality of samples. The processing may further comprise selecting a value for each of the samples using the corresponding probability distribution.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages.

Autoregressive neural networks generate output examples across multiple time steps by performing a forward pass at each time step. At a given time step, the autoregressive neural network generates a new output sample to be included in the output example conditioned on the output samples that have already been generated. This can result in a high quality output example but can consume a large amount of computational resources and take a large amount of time, i.e., because processing needs to be performed at a large number of time steps conditioned on the processing that was performed at earlier time steps.

On the other hand, a feedforward generative neural network as described in this specification can generate output example much faster than an autoregressive generative neural network while maintaining a high degree of quality of the generated output examples.

In particular, the described feedforward generative neural network generates the output example in a single inference step, i.e., with a single forward pass through the neural network. This greatly reduces the time and amount of computational resources required to generate the output example relative to how much time is consumed by an autoregressive neural network.

Additionally, because of the architecture of the feedforward neural network, the way the neural network is trained, or both, the feedforward generative neural network can generate output examples that are of comparable quality to those generated by the trained autoregressive neural network.

In particular, the feedforward neural network can receive as input a noise vector and processes the noise through multiple groups of convolutional neural network layers (that are conditioned on the context input). Because of this architecture, the neural network can be effectively conditioned on the context input to generate a high quality output example. Additionally, the feedforward neural network can have fewer parameters and be less computationally complex than the autoregressive neural network. For example, the autoregressive neural network can also be a convolutional neural network, but a more computationally complex neural network with more parameters than the feedforward neural network. For example, the autoregressive neural network can include skip connections that are not present in the feedforward neural network, have a larger amount of hidden units than the feedforward neural network, or both. Despite this, the feedforward neural network may still generate output examples of comparable quality due to the techniques described in this specification.

Moreover, by training the feedforward neural network to match outputs generated by a trained autoregressive neural network, the feedforward neural network can be trained to generate samples of comparable quality as the trained autoregressive neural network in a fraction of the time. The training of the feedforward neural network can optionally be further enhanced using other losses, e.g., one or more of a magnitude loss, a perceptual loss, or a contrastive loss, to improve the performance of the trained feedforward neural network without adding to the computational footprint of the feedforward neural network.

This may allow the feedforward neural network to be used to generate output examples in environments where generating high quality output examples with low latency is required or when the amount of computational resources available for executing the neural network is limited. For example, this can occur when the neural network is deployed on a mobile device or on a special-purpose personal computing device with limited processing power and memory, e.g., a smart speaker or other smart device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
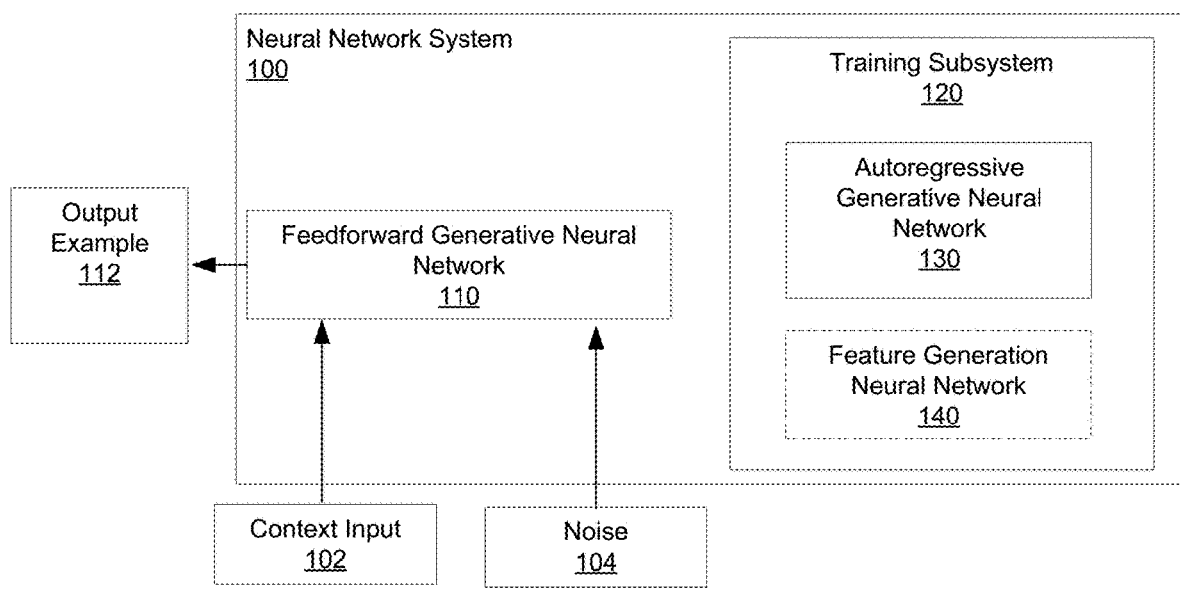
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives as input a context input 102 and noise 104 and generates an output example 112 conditioned on the context input 102 and the noise 104.

For example, the context input 102 can be linguistic features of text and the output example 112 can be a waveform of the text being verbalized, i.e., spoken. That is, the output example can be a sequence of values that characterizes the waveform, i.e., a sequence of amplitude values or compressed or companded amplitude values.

As another example, the context input 102 can be text and the output example 112 can be an image that is described by the text.

As yet another example, the context input 102 can be a sequence of video frames and the output example 112 can be a video frame that follows the last frame in the sequence of video frames.

In particular, the neural network system 100 includes a feedforward generative neural network 110.

The feedforward generative neural network 110 is a neural network that is configured to receive the context input 102 and the noise 104 and to generate a feedforward output that defines the output example 112.

The output example 112 includes multiple output samples, i.e., numeric values, and the feedforward generative neural network 110 generates the feedforward output that defines each of the multiple numeric values in a single inference step, i.e., in a single forward pass through the feedforward generative neural network 110 and, in particular, without being conditioned on any processing performed by the neural network 110 at any earlier inference steps.

Generally, the noise is a random noise vector that includes a noise value for each of the samples in the output example.

In particular, the feedforward output defines, for each sample in the output example 112, a respective probability distribution over possible values for the sample.

For example, the feedforward output can include, for each sample, a predicted value for the sample and/or parameters of a distribution over possible values for the sample. For example, the parameters can be the mean and standard deviation of a logistic distribution over possible values for the sample. Thus in some implementations the feedforward output includes, for each sample, a predicted value for the sample as well as the mean and standard deviation of a logistic distribution. Where, as described below, groups of CNN layers are stacked in sequence just the sample may be passed from one group of layers to the next and the overall mean and standard deviation can be determined from the individual means and standard deviations output by each group. In some other implementations, the feedforward output may not explicitly include a predicted sample value, but the predicted sample value can be determined from the parameters of the distribution over the possible sample values. For example, the predicted sample value may be determined as the sum of (i) the product of the corresponding noise value for the sample and the mean of the distribution for the sample and (ii) the standard deviation for the sample.

When the output example is a waveform, the feedforward generative neural network 110 generally includes a sequence of groups of convolutional neural network layers. Each group is conditioned on a conditioning tensor, i.e., on the context input 102, for example linguistic features providing phonetic and duration information. Each group is configured to receive an input waveform and to transform the input waveform conditioned on the conditioning tensor into an output waveform. Conditioning a convolutional layer on a conditioning tensor is described in WAVENET: A GENERATIVE MODEL FOR RAW AUDIO, available at https://arxiv.org/pdf/1609.03499.pdf, the entire contents of which are hereby incorporated by reference herein in their entirety. Thus, for the first group of convolutional layers, the input waveform is the random noise vector, and for the last group of convolutional layers the output is the feedforward output that defines the output example.

Example architectures for the feedforward generative neural network 110 are described in more detail below with reference to FIG. 5. Generating an output example using the feedforward generative neural network 110 is described in more detail below with reference to FIG. 2.

In order to train the feedforward generative neural network 110 to generate accurate feedforward outputs, the neural network system 100 also includes a training subsystem 120 that trains the feedforward generative neural network 110 to determine trained values of the parameters of the feedforward generative neural network 110, referred to in this specification as "feedforward parameters."

Once trained, the feedforward generative neural network 110 has been trained, the network 110 can be deployed and used to generate output examples for new received context inputs. For example, the network 110 can be implemented on a user device, e.g., a mobile device or a special purpose smart device, that has limited computational resources or that requires speech to be generated with extremely low latency.

In particular, the training subsystem 120 trains the feedforward generative neural network 110 using a trained autoregressive generative neural network 130.

The autoregressive generative neural network 130 is also configured to receive context inputs of the same type as the feedforward generative neural network 110 and to generate output examples of the same type as the output examples generated by the feedforward generative neural network 110. However, the autoregressive generative neural network 130 is configured to generate the values in an output example in an autoregressive manner over multiple time steps, i.e., to generate each sample in the output example conditioned on the values of the previous samples in the output example that were generated at earlier time steps.

For example, when the inputs are linguistic features and the outputs are waveforms, the autoregressive generative neural network 130 may be an auto-regressive convolutional neural network. An example of such an auto-regressive neural network is described in more detail in WAVENET: A GENERATIVE MODEL FOR RAW AUDIO, available at https://arxiv.org/pdf/1609.03499.pdf.

Generally, the autoregressive generative neural network 130, once trained, is able to generate very high quality outputs. However, because the feedforward neural network 110 generates output examples in a single pass, the feedforward neural network 110 may be able to generate output examples with much lower latency than the autoregressive neural network 130.

As will be described in more detail below, when using the autoregressive generative neural network 130 to train the feedforward neural network 110, the training subsystem holds the values of the parameters of the autoregressive neural network 130 fixed and uses the outputs generated by the autoregressive neural network 130 to evaluate the quality of the outputs generated by the feedforward neural network 110 during the training.

Example architectures for the autoregressive generative neural network 130 are described in more detail below with reference to FIG. 5.

Optionally, the training subsystem 120 also uses a feature generation neural network 140 to train the feedforward generative neural network 110.

The feature generation neural network 140 is a neural network that is configured to receive inputs that are of the same type as the output examples generated by the feedforward generative neural network 110 and the autoregressive generative neural network 130 and to generate features of the inputs as part of processing the inputs. The feature generation neural network 140 can generally be any neural network that processes the inputs to generate a score, classification, or regression output based on the input.

In particular, the training subsystem 120 uses features generated by the feature generation neural network 140 in the training of the feedforward generative neural network 110. The features can be the outputs of the output layer of the network 140, the outputs of an intermediate layer of the network 140, or a combination of the outputs of two or more layers of the network 140.

For example, the feature generation neural network 140 can be a neural network that converts an input of the same type as the output examples to an output that is of the same type as the context input and the features can be the output of one or more of the hidden layers of the feature generation neural network 140.

That is, when the output examples are waveforms and the context data is text, the feature generation neural network 140 may be a speech recognition neural network that converts the waveform of an utterance to a transcription of the utterance.

As another example, the feature generation neural network 140 and the autoregressive generative neural network 130 can be the same neural network and the features can be the output of one or more of the hidden layers of the autoregressive generative neural network 130, i.e., instead of the likelihood distribution that is the output of the output layer of the autoregressive generative neural network 130.

Both the feature generation neural network 140 and the autoregressive generative neural network 130 are fully trained before being used in the training of the feedforward neural network 110.

Training the feedforward generative neural network 110 is described in more detail below with reference to FIGS. 3 and 4.

Figure 2:
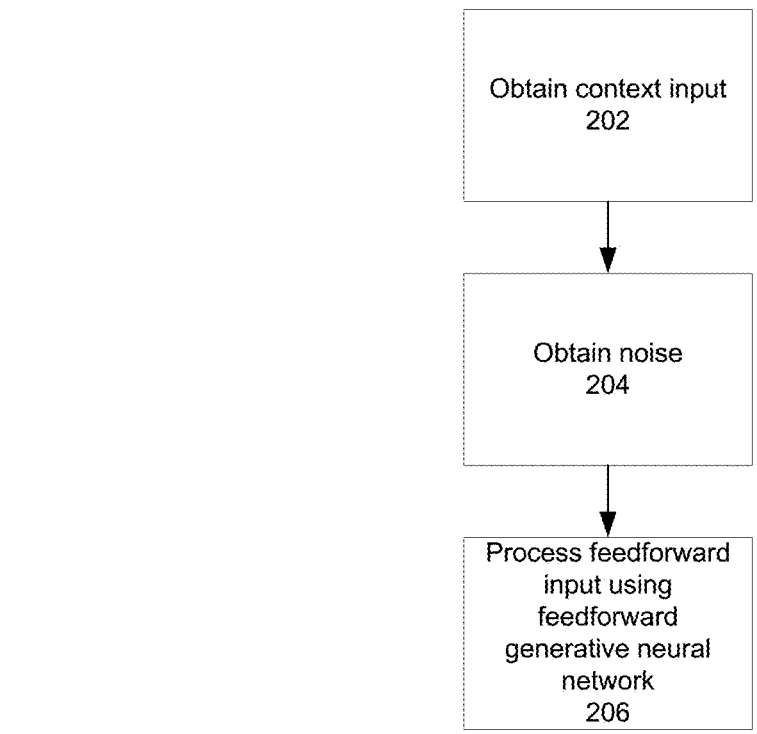
FIG. 2 is a flow diagram of an example process for generating an output example.

FIG. 2 is a flow diagram of an example process 200 for generating an output example using the feedforward generative neural network. For convenience, the process 200 will be described as being performed by a system of one or more computers located in one or more locations. For example, a neural network system, e.g., the neural network system 100 of FIG. 1, appropriately programmed, can perform the process 200.

The system receives a context input in the form of a conditioning tensor (step 202).

The system obtains noise for use in generating the output example (step 204). In particular, the noise is a random noise vector that includes a noise value for each of the samples in the output example. For example, the system can sample each noise value in the noise vector from a pre-determined distribution, e.g., a logistic distribution.

The system processes the noise vector using the feedforward generative neural network to generate the output example (step 206). That is, the system processes the noise vector using the feedforward generative neural network while the neural network is conditioned on the conditioning tensor. When the feedforward generative neural network includes a sequence of multiple groups of convolutional layers, each group receives an input waveform and maps the input waveform to an output defining an output waveform. For the first group, the input waveform is the noise vector and, for each other group, the input waveform is the waveform defined by the output of the preceding group in the sequence.

Figure 3:
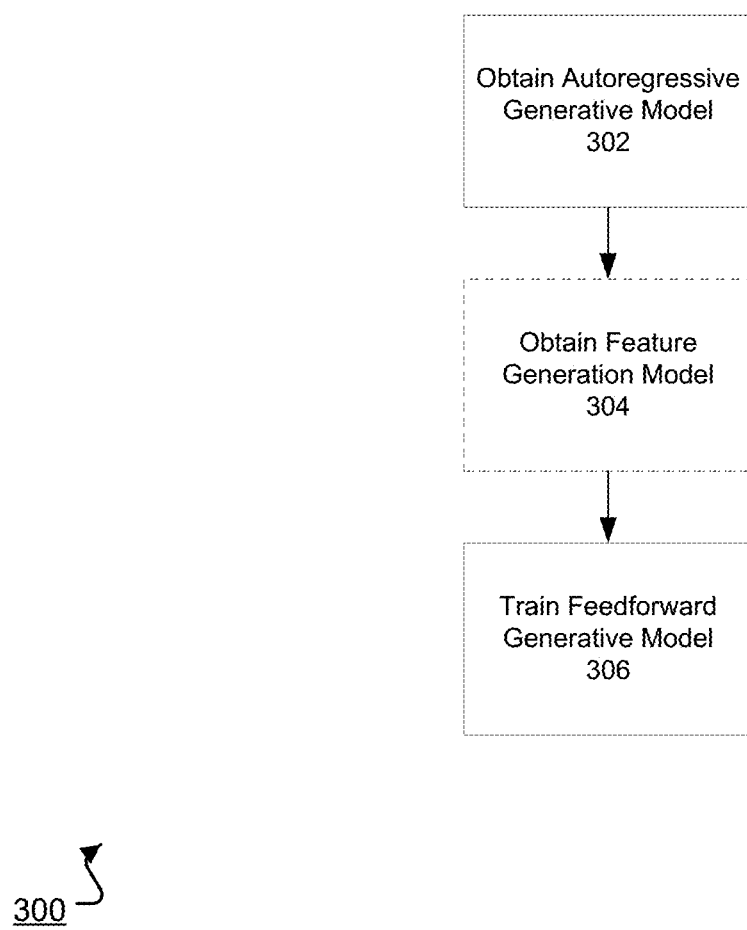
FIG. 3 is a flow diagram of an example process for training a feedforward generative neural network.

FIG. 3 is a flow diagram of an example process 300 for training a feedforward generative neural network. For convenience, the process 300 will be described as being performed by a system of one or more computers located in one or more locations. For example, a neural network system, e.g., the neural network system 100 of FIG. 1, appropriately programmed, can perform the process 300.

The system obtains data specifying a trained autoregressive generative neural network (step 302).

Optionally, the system obtains data specifying a feature generation neural network (step 304). As described above, the feature generation neural network can be the same network or a different network from the autoregressive neural network.

The system trains a feedforward generative neural network using the trained autoregressive generative neural network and, optionally, the trained feature generation neural network (step 306).

In particular, the system trains the feedforward generative model to determine trained values of the feedforward parameters from initial values of the feedforward parameters by optimizing an objective function that depends at least in part on a divergence between probability distributions generated by the feedforward generative model and probability distributions generated by the trained autoregressive generative neural network.

During the training, the system adjusts the values of the feedforward parameters while holding the trained values of the autoregressive parameters and, if used, the trained values of the feature generation parameters fixed.

In particular, the system trains the feedforward generative neural network to minimize a loss function that includes a divergence loss and optionally one or more of: a magnitude loss, a perceptual loss, or a contrastive loss. When the loss function includes multiple losses, the loss function can be a weighted sum of the losses. The individual losses will be described in more detail below with reference to FIG. 4.

Figure 4:
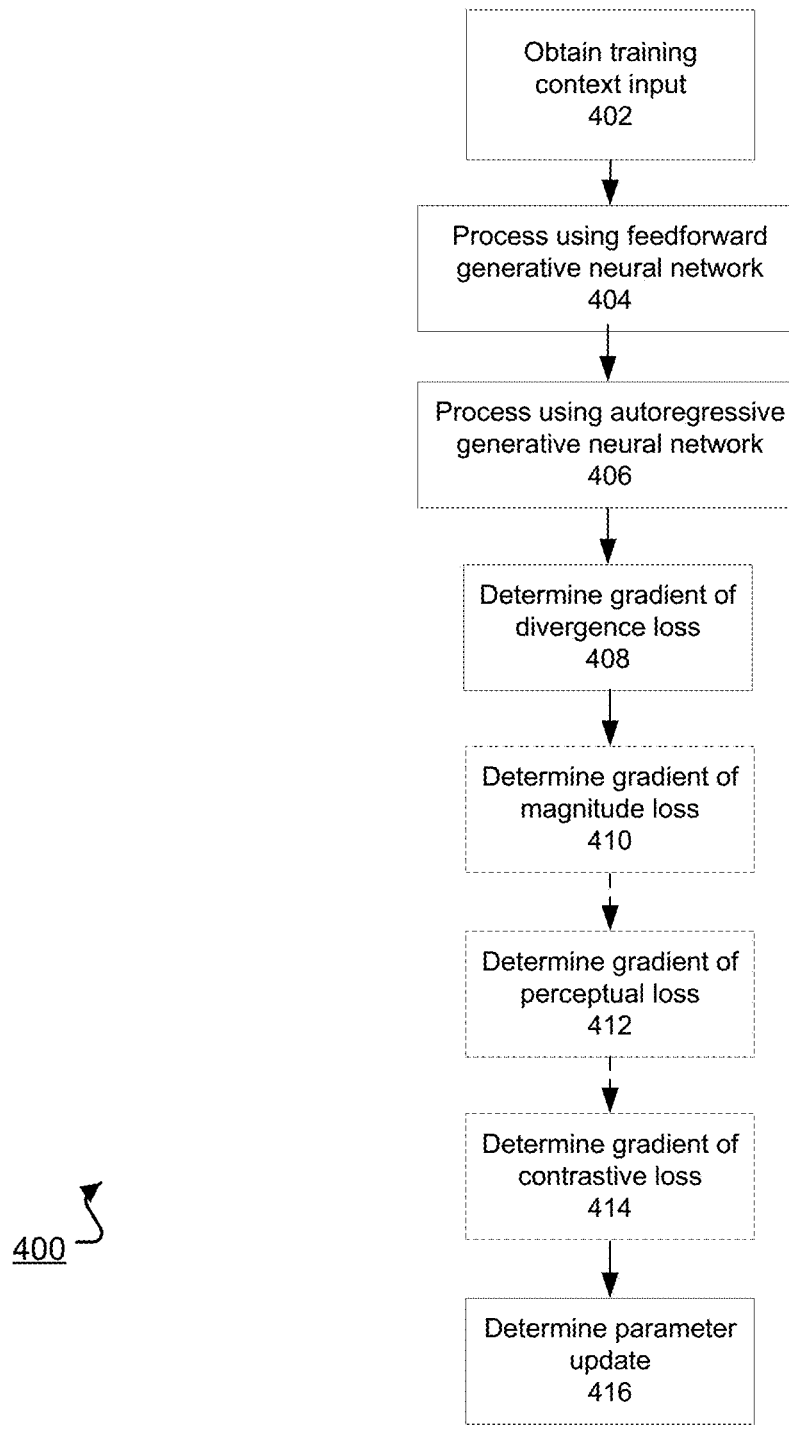
FIG. 4 is a flow diagram of an example process for determining an update to current values of the feedforward parameters.

FIG. 4 is a flow diagram of an example process 400 for determining an update to current values of the feedforward parameters. For convenience, the process 400 will be described as being performed by a system of one or more computers located in one or more locations. For example, a neural network system, e.g., the neural network system 100 of FIG. 1, appropriately programmed, can perform the process 400.

The system can repeatedly perform the process 400 to train the feedforward generative neural network by repeatedly adjusting the values of the feedforward parameters.

The system obtains a training context input (step 402). For example, the system can sample a batch of training context inputs and the obtained training context input can be one of the inputs in the batch.

The system processes a training feedforward input that includes the training context input using the feedforward generative neural network in accordance with current values of the feedforward parameters to generate a training feedforward output that defines an output example (step 404). As described above, the training feedforward output includes parameters of a respective likelihood distribution for each of the generation time steps.

The system processes the training context input using the trained autoregressive generative neural network to generate a respective autoregressive output for each of the plurality of generation time steps (step 406). As described above, the autoregressive output for a given generation time step also defines a likelihood distribution for the time step. At each time step, the system conditions the autoregressive generative neural network on the corresponding portion of the output example generated by the feedforward neural network, i.e., so that the trained autoregressive generative neural network is used to score the output example generated by the feedforward neural network. That is, when generating the autoregressive output corresponding to a given sample in the output example, the autoregressive generative neural network is conditioned on the training context input and on the samples generated by the feedforward neural network that precede the given sample in the output example. This is described graphically in FIG. 5 and in more detail in the accompanying description.

The system determines a gradient of a divergence loss, i.e., a gradient to minimize the divergence loss, with respect to the feedforward parameters. The divergence loss depends on, for each of the generation time steps, a divergence from the likelihood distribution defined by the autoregressive output for the generation time step to the likelihood distribution for the generation time step defined by the training feedforward output (step 408). In particular, the divergence loss can be a sum of the divergences for each of the generation time steps. The system can use any of a variety of divergence measures that measure how one probability distribution diverges from another. For example, the divergence can be a KL (Kullback-Leibler) divergence. As another example, the divergence can be a Jensen-Shannon divergence.

By minimizing this divergence loss, the system trains the feedforward network to attempt to match the probability of its own samples under the distribution already learned by the generative neural network.

In a case where the KL divergence $D_{KL}$ is employed the divergence loss may in practice be calculated by subtracting an entropy, $H_F$, of the feedforward model distribution from a cross-entropy $H_{FA}$ of the feedforward and autoregressive distributions, $D_{KL}=H_{FA}-H_F$, where $H_F$ is given by:

$$\mathbb{E}_{z \sim L(0,1)}\left[\sum_{t=1}^{T} \ln s(z_{<t}, \theta)\right] + 2T$$

for T samples, where $s(z_{<t},\theta)$ is the standard deviation from the feedforward model for sample t (generated based on the noise values z for the samples preceding t in the output example and in accordance with current vales of the feedforward parameters $\theta$) and T is the total number of samples in the output example. The cross-entropy term $H_{FA}$ is given by:

$$\sum_{t=1}^{T} \mathbb{E}_{p_F(x_{<t})} H(p_F(x_t|x_{<t}), p_A(x_t|x_{<t}))$$

Here, for every sample $x_t$ drawn from the feedforward model distribution $p_F$, the values of $p_A$ from the autoregressive model can be determined in parallel and then the entropy term H ($p_F$, $p_A$) can be evaluated by drawing multiple different samples $x_t$ from $p_F$ for each time step t.

When the output examples are waveforms, the system optionally also determines a gradient of a magnitude loss (also referred to as a power loss) with respect to the feedforward parameters, i.e., a gradient to minimize the magnitude loss with respect to the feedforward parameters (step 410).

In particular, in order to determine this gradient, the system obtains a ground-truth output example for the training context input. The ground-truth output example is the output example that should be generated by the autoregressive and feedforward generative neural networks for the training context input, i.e., a known output for the training context input. The system then generates a magnitude spectrogram of the ground-truth training example.

The system also generates, from the training feedforward output, a predicted output example, i.e., by sampling an output sample from the probability distribution at each of the generation time steps. The system also generates a magnitude spectrogram of the predicted output example.

The system then determines a gradient with respect to the feedforward parameters of a magnitude loss that depends on the difference between the magnitude spectrogram of the ground-truth output example and the magnitude spectrogram of the predicted output example, i.e., to encourage the two output examples to have similar magnitude spectrograms. This may be, for example, a squared difference in Short Term Fourier Transforms of the ground truth and predicted waveforms. Including such a magnitude loss term can help reduce the risk of the feedforward generative model collapsing to a high-entropy mode resembling whispering.

The system further optionally determines a gradient of a perceptual loss with respect to the feedforward parameters for the training context input (step 412).

To determine this gradient, the system processes the ground-truth output example using the trained feature generation neural network to obtain features of the ground-truth output example and then processes the predicted output example using the trained feature generation neural network to obtain features of the predicted output example.

$\varphi_k(\hat{x})$ The system then determines a gradient to minimize a perceptual loss that depends on a measure of difference between the features of the ground-truth output example and the features of the predicted output example. For example, when the features are the outputs of a layer that have dimensions $L_k \times C_k$ the perceptual loss $loss_{aux}$ can satisfy:

$$G_{\phi_k} = \frac{1}{L_k C_k} \phi_k(x)^T \phi_k(x)$$

$$\varphi_k(\hat{x})\ loss_{aux} = \|G_{\phi_k}(x) - G_{\phi_k}(\hat{x})\|_2^2,$$

$\varphi_k(\hat{x})$ where $\varphi_k(\hat{x})$ are the features of the ground-truth output example and are the features of the predicted output example. Including such a perceptual loss term can help to ensure good feature representations, for example the features may include features for recognizing phones to penalize bad pronunciation.

As another example, the loss can be the Euclidean distance between the features.

The system further optionally determines a gradient of a contrastive loss with respect to the feedforward parameters (step 414).

To determine this gradient, the system obtains a different context input, i.e., a context input for which the ground truth output example is not the same as the ground truth output example for the training context input.

The system processes the different context input using the trained autoregressive generative neural network to obtain, for each of the plurality of generation time steps, a respective different autoregressive output. That is, the system conditions the trained autoregressive generative neural network on the different context input while also continuing to condition the trained autoregressive generative neural network on the output samples generated by the feedforward neural network.

The system then determines a gradient with respect to the feedforward parameters to maximize a contrastive loss (or to minimize the negative of the contrastive loss) that depends at least in part on, for each of the generation time steps, a divergence from the likelihood distribution defined by the different autoregressive output for the generation time step to the likelihood distribution for the generation time step defined by the training feedforward output. For example the contrastive loss may be a difference between the divergence loss when the conditioning vectors and the same and the loss when they are different, optionally with a relative weighting of these terms. Like the divergence loss, the contrastive loss can be a sum of the individual divergences for each of the generation time steps and the divergence measure can be the same as the divergence measure used for the divergence loss.

Thus in addition to minimizing the divergence loss when the feedforward and autoregressive models are conditioned on the same information the contrastive loss may maximize the divergence loss when the models are conditioned on different information. This penalizes waveforms which have a high likelihood regardless of the conditioning vector.

The system determines an update to the current values of the feedforward parameters (step 416). In particular, the system determines the update from the gradient of the divergence loss and, when used, the gradients of the magnitude loss, the perceptual loss, and the contrastive loss. As described above, when multiple losses are used, the update is a weighted sum of the losses.

The system generally repeats the process 400 for each training context input in a batch of training context inputs to generate a respective update to the current values for each training context input and then adds the updates to generate a final update. The system can then update the current values of the parameters using the final update. The manner in which the system updates the current values depends on the optimizer used by the system when updating the parameters. For example, when using stochastic gradient descent, the system can apply a learning rate to the final update and then add or subtract the result to the current values of the parameters.

Figure 5:
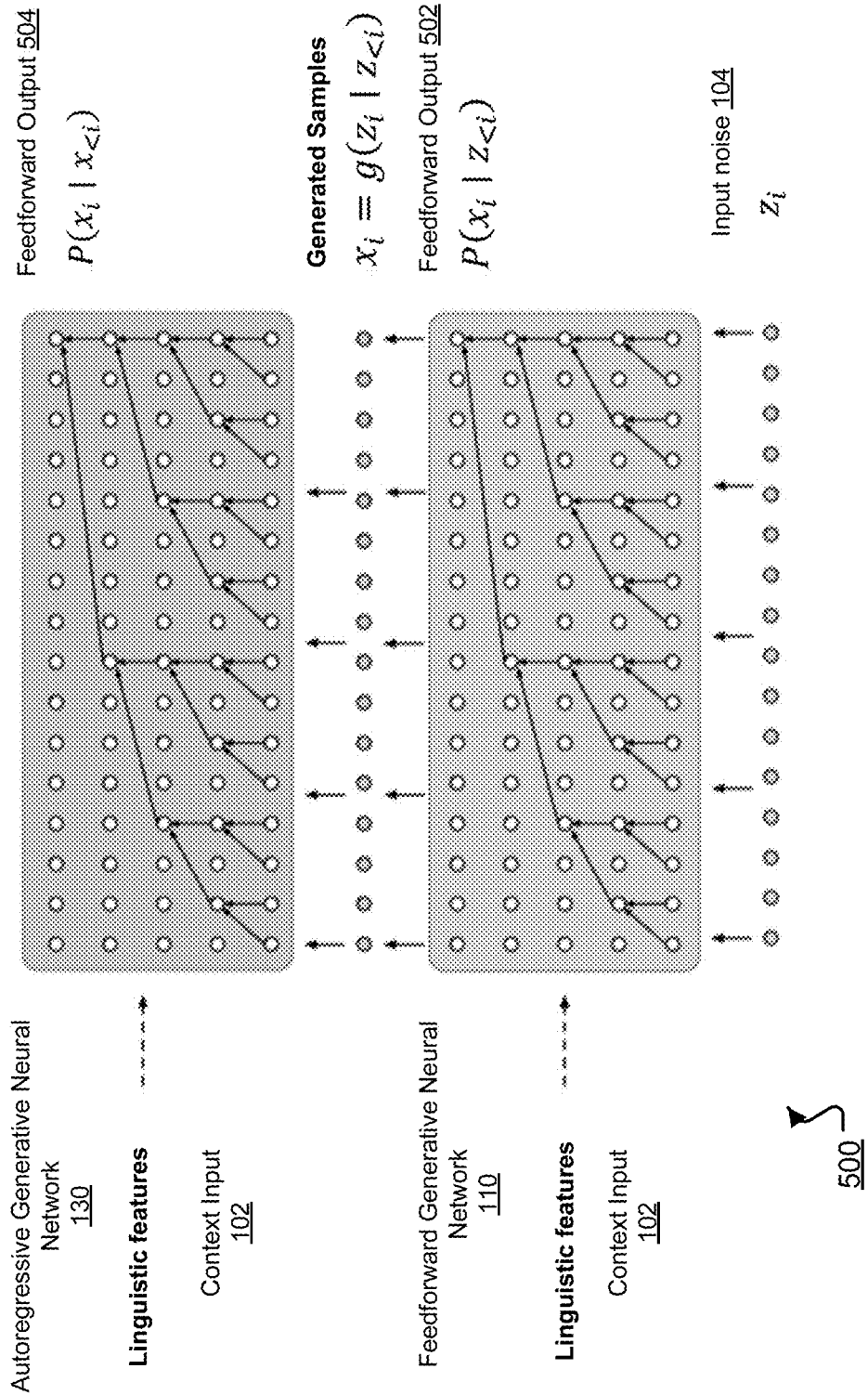
FIG. 5 is a diagram of the autoregressive generative neural network 130 being used to train the feedforward generative neural network 110.

FIG. 5 is a diagram 500 of the autoregressive generative neural network 130 being used to train the feedforward generative neural network 110. As shown in FIG. 5, the two neural networks are configured to generate waveforms and the conditioning input 102 for both neural networks is linguistic features of a text segment.

Additionally, as shown in FIG. 5, both neural networks are convolutional neural networks. In particular, the simplified example of FIG. 5 shows both neural networks having a single group of dilated convolutional layers, with the dilation increasing after each layer in the group. In practice, however, both neural networks can include a sequence of multiple groups of dilated convolutional layers, with each group being configured to receive an input waveform and to transform the waveform conditioned on the conditioning tensor, i.e., on the linguistic features, into an output waveform. In particular, the convolutional layers in both neural networks have gated activation functions that are conditioned not only on the output of the convolution performed by the layer but are also conditioned on the conditioning tensor, as described WAVENET: A GENERATIVE MODEL FOR RAW AUDIO, available at https://arxiv.org/pdf/1609.03499.pdf. That is, the dilation can re-set after the final layer in each group. In some cases, both networks also include residual connections from the input to a given group to the output of the given group.

Generally, the architectures of the two neural networks can be largely the same. For example, both networks can include the same number of groups of convolutional layers. However, the feedforward generative neural network 110 is configured to receive the noise input 104 while the autoregressive generative neural network 130 needs to be conditioned on a partially generated output example (the "generated samples" of FIG. 5). Thus, the feedforward generative neural network 110 can generate the output example over a single inference step while the autoregressive generative neural network 130 requires many inference steps to generate an output example.

Additionally, in some implementations, the architecture of the feedforward generative neural network 110 is less computationally complex than the architecture of the autoregressive generative neural network 130. For example, while the two networks have the same number of groups of convolutional layers, the autoregressive generative neural network 130 may have skip connections that connect the outputs of each group of convolutional layers while the feedforward generative neural network 110 does not. As another example, the feedforward generative neural network 110 can have fewer hidden units in the gating and residual components of the network than does the autoregressive generative neural network 130.

Referring now to the example of FIG. 5, at a given iteration during the training of the feedforward network 110, the feedforward network 110 has generated a feedforward output 502 that defines an output example that includes generated samples xo through xi. For example, as described above, the feedforward output 502 can include for each output sample a generated value of the output sample and parameters of a distribution over possible values of the output sample. As another example, as also described above, the feedforward output 502 can include just the parameters of the distribution and the sample can be determined based on the corresponding noise value and the parameters.

The generated samples xo through xi-1, i.e., all of the samples before x; in the output example generated by the feedforward network 110 are then fed as input to the autoregressive network 130 at a given generation time step. At the given generation time step, the autoregressive network 130 generates an autoregressive output 130 that defines a likelihood distribution over possible values for output sample i in the output example.

The two probability distributions, i.e., one generated by the feedforward neural network 110 and on generated by the autoregressive neural network 130 conditioned on the output samples generated by the feedforward neural network 110, are used to train the feedforward neural network 110 as described above without adjusting the trained autoregressive neural network 130. Thus, the trained autoregressive neural network 130 is used to evaluate the quality of the outputs generated by the feedforward neural network 110.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of training a feedforward generative neural network for generating an audio waveform based on an input text segment using a single forward pass of the feedforward generative neural network, wherein the training comprises:
    obtaining a training context input specifying features of a text segment;
    processing a training feedforward input comprising the training context input using a single forward pass of the feedforward generative neural network in accordance with current values of parameters of the feedforward generative neural network to generate a training feedforward output comprising output values for a plurality of generation time steps;
    processing the training context input using an autoregressive generative neural network that has been trained to autoregressively generate a plurality of autoregressive outputs, wherein the autoregressive generative neural network is a different and separate neural network from the feedforward generative neural network, and the processing comprises, for each respective generation time step of the plurality of generation time steps, using a respective one of a plurality of forward passes of the autoregressive generative neural network to generate a respective autoregressive output for the respective generation time step conditioned on (i) the training context input and (ii) output samples defined by the training feedforward output at one or more generation time steps that precede the respective generation time step;
    determining a first gradient with respect to the parameters of the feedforward generative neural network to minimize a divergence loss that depends on a plurality of first divergences that include, for each of the plurality of generation time steps, a respective first divergence from a distribution defined by the autoregressive output and a distribution for the generation time step defined by the training feedforward output; and
    determining an update to the current values of the parameters of the feedforward generative neural network based at least in part on the first gradient.

2. The method of claim 1, wherein the training feedforward input further comprises a respective noise input at each of the generation time steps.

3. The method of claim 1, wherein the training further comprises:
    obtaining a ground-truth output example for the training context input; and
    generating, from the training feedforward output, a predicted output example by sampling from the distributions defined by the training feedforward output.

4. The method of claim 3, wherein the ground-truth output example and the predicted output example are speech waveforms, wherein the training further comprises:
    generating a first magnitude spectrogram of the ground-truth output example;
    generating a second magnitude spectrogram of the predicted output example; and
    determining a second gradient with respect to the feedforward parameters to minimize a magnitude loss that depends on a difference between the first and second magnitude spectrograms, and wherein determining the update to the current values of the feedforward parameters comprises determining the update based at least in part on the second gradient.

5. The method of claim 3, wherein the training further comprises:
   processing the ground-truth output example using a trained feature generation neural network to obtain features of the ground-truth output example, wherein the trained feature generation neural network is a pre-trained neural network that takes a waveform as input;
   processing the predicted output example using the trained feature generation neural network to obtain features of the predicted output example; and
   determining a third gradient with respect to the feedforward parameters to minimize a perceptual loss that depends on a measure of difference between the features of the ground-truth output example and the features of the predicted output example, and wherein determining the update to the current values of the feedforward parameters comprises determining the update based at least in part on the third gradient.

6. The method of claim 5, wherein the feature generation neural network is a speech recognition neural network.

7. The method of claim 5, wherein the features are outputs of an intermediate layer in the feature generation network.

8. The method of claim 5, wherein the feature generation neural network is a trained autoregressive generative neural network.

9. The method of claim 1, wherein the training further comprises:
   obtaining a different context input;
   processing the different context input using the trained autoregressive generative neural network to obtain, for each of the plurality of generation time steps, a respective different autoregressive output; and
   determining a fourth gradient with respect to the feedforward parameters to maximize a contrastive loss that depends at least in part on, for each of the generation time steps, a second divergence from a likelihood distribution defined by the different autoregressive output for the generation time step and the likelihood distribution for the generation time step defined by the training feedforward output, and wherein determining the update to the current values of the feedforward parameters comprises determining the update based at least in part on the fourth gradient.

10. The method of claim 1, wherein the first divergence is a KL divergence.

11. The method of claim 1, wherein the first divergence is a Jensen -Shannon Divergence.

12. The method of claim 1, wherein the divergence loss depends at least in part on a sum of the first divergences at each of the generation time steps.

13. A method of generating an output audio waveform for an input text segment, the method comprising:
   receiving a context input including features of the input text segment; and
   generating the output audio waveform by processing a feedforward network input comprising the context input using a feedforward generative neural network using a single forward pass of the feedforward generative neural network, a feedforward output that defines an output example of the output audio waveform, wherein the output example comprises a plurality of output samples that include, for each of a plurality of generation time steps, a respective output sample at the respective generation time step, and
wherein the feedforward generative neural network has been trained using a training procedure comprising:
   obtaining a training context input specifying features of a text segment;
   processing a training feedforward input comprising the training context input using a single forward pass of the feedforward generative neural network in accordance with current values of parameters of the feedforward generative neural network to generate a training feedforward output comprising output values for a plurality of generation time steps;
   processing the training context input using an autoregressive generative neural network that has been trained to autoregressively generate a plurality of autoregressive outputs, wherein the autoregressive generative neural network is a different and separate neural network from the feedforward generative neural network, and the processing comprises, for each respective generation time step of the plurality of generation time steps, using a respective one of a plurality of forward passes of the autoregressive generative neural network to generate a respective autoregressive output for the respective generation time step conditioned on (i) the training context input and (ii) output samples defined by the training feedforward output that has been generated for one or more generation time steps that precede the respective generation time step;
   determining a first gradient with respect to the parameters of the feedforward generative neural network to minimize a divergence loss that depends on a plurality of first divergences that include, for each of the plurality of generation time steps, a respective first divergence from a likelihood distribution defined by the autoregressive output and a likelihood distribution for the generation time step defined by the training feedforward output; and
   determining an update to the current values of the parameters of the feedforward generative neural network based at least in part on the first gradient.

14. The method of claim 13, wherein the feedforward network input further comprises a noise input.

15. A system comprising:
one or more computers; and
one or more storage devices storing instructions that when executed by the one or more computers, cause the one or more computers to perform operations for training a feedforward generative neural network for generating an audio waveform based on an input text segment using a single forward pass of the feedforward generative neural network,
wherein the training comprises:
   obtaining a training context input specifying features of a text segment;
   processing a training feedforward input comprising the training context input using a single forward pass of the feedforward generative neural network in accordance with current values of parameters of the feedforward generative neural network to generate a training feedforward output comprising output values for a plurality of generation time steps;
   processing the training context input using an autoregressive generative neural network that has been trained to autoregressively generate a plurality of autoregressive outputs, wherein the autoregressive generative neural network is a different and separate neural network from the feedforward generative neural network, and the processing comprises, for each respective generation time step of the plurality of generation time steps, using a respective one of a plurality of forward passes of the autoregressive generative neural network to generate a respective autoregressive output for the respective generation time step conditioned on (i) the training context input and (ii) output samples defined by the training feedforward output at one or more generation time steps that precede the respective generation time step;

determining a first gradient with respect to the parameters of the feedforward generative neural network to minimize a divergence loss that depends on a plurality of first divergences that include, for each of the plurality of generation time steps, a respective first divergence from a distribution defined by the autoregressive output and a distribution for the generation time step defined by the training feedforward output; and determining an update to the current values of the parameters of the feedforward generative neural network based at least in part on the first gradient.

16. The system of claim 15, wherein the training feedforward input further comprises a respective noise input at each of the generation time steps.

17. The system of claim 15, wherein the training further comprises:
obtaining a ground-truth output example for the training context input; and
generating, from the training feedforward output, a predicted output example by sampling from the distributions defined by the training feedforward output.

18. The system of claim 17, wherein the ground-truth output example and the predicted output example are speech waveforms, wherein the training further comprises:
generating a first magnitude spectrogram of the ground-truth output example;
generating a second magnitude spectrogram of the predicted output example; and
determining a second gradient with respect to the parameters of the feedforward generative neural network to minimize a magnitude loss that depends on a difference between the first and second magnitude spectrograms, and wherein determining the update to the current values of the parameters comprises determining the update based at least in part on the second gradient.

19. The system of claim 17, wherein the training further comprises:
processing the ground-truth output example using a trained feature generation neural network to obtain features of the ground-truth output example, wherein the trained feature generation neural network is a pre-trained neural network that takes a waveform as input;
processing the predicted output example using the trained feature generation neural network to obtain features of the predicted output example; and
determining a third gradient with respect to the parameters to minimize a perceptual loss that depends on a measure of difference between the features of the ground-truth output example and the features of the predicted output example, and wherein determining the update to the current values of the parameters comprises determining the update based at least in part on the third gradient.

* * * * *